Sept. 26, 1944.  W. H. WOODWARD  2,358,844
ADJUSTABLE BRACKET
Filed March 26, 1943
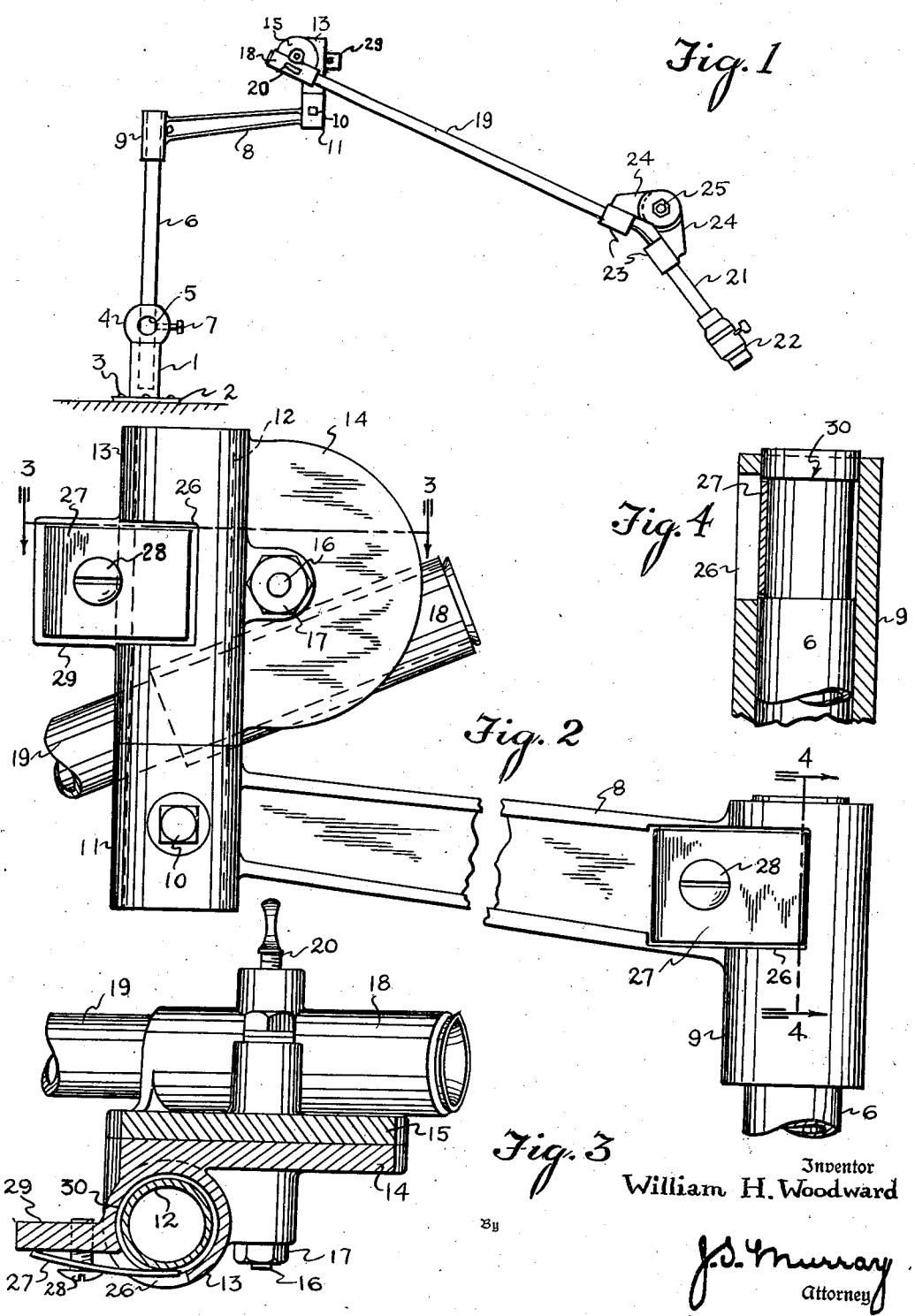
Inventor
William H. Woodward
By J. S. Murray
Attorney Patented Sept. 26, 1944

2,358,844

UNITED STATES PATENT OFFICE 2,358,844

ADJUSTABLE BRACKET

William H. Woodward, Detroit, Mich.

Application March 26, 1943, Serial No. 480,713

5 Claims. (Cl. 248—121)

This invention relates to adjustable brackets and particularly adjustable lamp brackets.

An object of the invention is to provide improved means for applying a desired frictional restraint to a bracket post swiveled in a socket, so as to avoid accidental or inadvertent rotative disturbance of the relation between such post and socket.

Another object is to provide a common means for frictionally restraining a bracket post and a socket member swivelly receiving such post from relative rotative disturbance and for avoiding relative shifting of said parts axially thereof.

Another object is to employ a spring mounted on a socket member to impose a frictional restraint on a post swiveled in such member, thereby maintaining a desired swivel adjustment of the post and socket member, and to further annularly groove the post for engagement by the spring, thus preventing relative shifting of the post and socket member along their common axis.

These and various other objects are attained by the construction hereinafter described and illustrated in the accompanying drawing, wherein:

Fig. 1 is a side elevational view of the improved adjustable bracket.

Fig. 2 is an elevational view of a portion of the reverse side of said bracket.

Fig. 3 is a cross sectional view taken on the line 3—3 of Fig. 2.

Fig. 4 is a sectional detail taken on the line 4—4 of Fig. 2 to show engagement of a spring and post.

In these views, the reference character 1 designates a supporting base for the bracket, one end of said base having an annular flange 2 attachable to any desired face by screws 3. The other end of said base has a spherical enlargement 4 formed with two transverse bores 5 in either of which a post 6 may be rigidly held in selective positions of sliding adjustment by a set screw 7.

Swiveled on said post is one end of a cast arm 8 extending approximately transversely to the post, said end forming a sleeve type socket 9 to receive the post. Secured by a set screw 10 in a sleeve type socket 11 formed on the other end of said arm is a relatively short post 12 whereon is swiveled a sleeve type socket 13 integrally carrying a circular friction plate 14. Bearing on and mated with the plate 14 is a similar plate 15, the two plates being interconnected by a bolt 16, which with its nut 17 regulates the pressure mutually applied by said plates. A sleeve type socket 18 integrally formed on the plate 15 receives one end of a tubular arm 19, fastened in the socket by a set screw 20.

To the other end of the arm 19 is swivelly connected a shorter tubular arm 21 serving to mount a lamp socket 22 or any other element requiring considerable universal adjustment. The illustrated connection between the arms 19 and 21 is established by sleeve type socket members 23 respectively receiving said arms and integrally formed with friction lugs 24 interconnected under selective pressure by a screw 25 and a suitable nut (not shown).

The present invention lies particularly in a means associated with the socket members 9 and 13 to yieldably resist swivelling thereof on the posts, and to further prevent axial shifting of said socket members. Thus each socket member 9 and 13 is slotted as indicated at 26 to permit a rectangular sheet metal spring 27 to be stressed against the corresponding post, said springs being clamped, under regulable pressure, by screws 28, respectively to the arm 8 and to a lug 29 radially projecting from the socket member 13. As best appears in Fig. 3, the springs 27 are bridged between their ends, each bearing at one end on the corresponding post and their opposite ends respectively bearing on the arm 8 and lug 29, the screws 28 engaging said springs between their ends. Preferably the springs are bowed slightly, the screw-applied stresses tending to reduce curvature.

Heretofore it has been necessary to use set screws, cotter pins, set collars and the like to prevent relative axial shifting of a post and socket member receiving such post. In the disclosed construction, the springs 27 are made to positively resist any such axial shifting by forming the posts with annular grooves 30 receiving the springs, one of such grooves being shown in Fig. 4. This simplifies both construction and assembly, while improving appearance of the bracket.

The described bracket is applicable to many purposes, and is particularly suited to carry a lamp for illuminating machine operations. Considerable adjustability is especially necessary for a lamp bracket used on machine tools to suit varying positions of the work and working members, and it is highly important to avoid accidental loosening of the bracket connections since this might permit some portion of the bracket to be struck by a moving part of a machine. The improved manner in which the springs 27 restrain sliding movement of the socket members on the posts is of so positive a nature as to be especially desirable in a bracket closely associated with machinery.

When it is desired to apply an especially heavy restraint to either or both posts 6 and 12, two or more of the springs 27 may be superposed one on another to build up stiffness. For installations using quite long arms 19 or 21, such heavy restraint may be necessary.

What I claim is:

1. In an adjustable bracket, a post having an annular groove, a socket member swivelly mounted on the post and slotted to give access to said groove, a spring extending through the slot of the socket member into said groove and stressed against the post to yieldably resist relative rotation of the socket member and post, and a support for the spring carried by the socket member said spring having opposed edges coacting with the opposed annular walls of the groove and thus positively restraining the socket member and post from relative longitudinal sliding.

2. In an adjustable bracket, as set forth in claim 1, said spring having opposite ends respectively seated against the post and said support, and being bridged between such ends, means engaging the spring between said ends for securing the spring to the said support and regulating the stress of the spring.

3. In an adjustable bracket as set forth in claim 1, a common means for securing the spring to said support and regulating the stress of the spring.

4. In an adjustable bracket as set forth in claim 1, said support for the spring rigidly and laterally projecting from the socket member in proximity to said slot.

5. In an adjustable bracket as set forth in claim 1, said support for the spring rigidly and laterally projecting from the socket member, the spring being elongated transversely to the post and being curved from end to end, means engaging the spring between its ends securing the spring to said support and applying a stress to the spring opposing its curvature.

WILLIAM H. WOODWARD.